United States Patent Office 3,798,171
Patented Mar. 19, 1974

3,798,171
PROCESS FOR PRODUCING MONOMER MIXTURE
Masao Ishii, Tokyo, and Takashi Sunamori and Sadao Kimura, Ohtake, Japan, assignors to Mitsubishi Rayon Co., Ltd., Tokyo, Japan
No Drawing. Continuation-in-part of application Ser. No. 767,818, Oct. 15, 1968, now Patent No. 3,652,478. This application Dec. 2, 1971, Ser. No. 204,369
Claims priority, application Japan, Oct. 27, 1967, 42/69,146, 42/69,147
Int. Cl. C08g 20/20
U.S. Cl. 252—182       8 Claims

ABSTRACT OF THE DISCLOSURE

A process for producing a copolymerizable monomer mixture consisting essentially of an N-alkoxyalkylated unsaturated carboxylic acid amide and at least one $\alpha,\beta$-ethylenically unsaturated carboxylic acid which comprises mixing an unsaturated carboxylic acid amide having the formula:

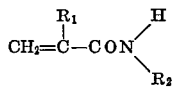

wherein $R_1$ is hydrogen or methyl group and $R_2$ is hydrogen, a lower alkyl group or a

group in which $R_3$ is hydrogen or a branched or straight alkyl group having 1 to 12 carbon atoms, and at least one $\alpha,\beta$-ethylenically unsaturated carboxylic acid or its anhydride with at least one organic solvent capable of forming an azeotropic mixture with water, at least one alcohol and, if necessary, at least one aldehyde and then subjecting the resulting mixture to dehydration-condensation under a reduced or an ordinary pressure. Said process enables the monomer mixture produced to be used in the production of a copolymer for coating composition without isolating the N-alkoxyalkylated unsaturated carboxylic acid amide from the mixture.

CROSS-REFERENCES TO RELATED APPLICATIONS

This is a continuation-in-part of our copending application Ser. No. 767,818 filed Oct. 15, 1968, now Pat. 3,652,478.

This invention relates to a process for producing a copolymerizable monomer mixture consisting essentially of an N-alkoxyalkylated unsaturated carboxylic acid amide and at least one $\alpha,\beta$-ethylenically unsaturated carboxylic acid or its anhydride.

Relatively low molecular weight vinyl polymers containing N-alkoxyalkyl groups as self-cross-linkable functional groups have widely been used as coating materials for metals, fibers, woods, papers, stones, asbestos, etc., because said polymers are excellent in self-cross-linkability and film-formability; cross-linked films formed from said polymers are excellent in adhesiveness to substrates, such as metals, fibers, woods, papers, stones, asbestos, etc.; and excellent in resistance to weather, water, chemicals and corrosion; and said polymers are excellent in affinity with pigments and other fillers and hence can form cross-linked films having an excellent appearance.

Methods for producing polymers having such excellent characteristics are disclosed in U.S. Pats. Nos. 3,037,963; 3,163,263 and 2,870,611; British Pats. Nos. 1,027,813 and 1,115,130; and the like. The methods for producing said polymers disclosed in these patents comprise copolymerizing an unsaturated carboxylic acid amide with other copolymerizable monomers in solution to obtain a copolymer containing carboxylic acid amide groups, and then reacting said carboxylic acid amide groups with aldehydes and alcohols in the presence of an acid catalyst to convert them into N-alkoxyalkylamide groups. The disadvantages of the coating materials obtained by said methods are that the excessive aldehydes contained in the coating material solution have unpleasant smell and adversely affect the human body and that the acid catalyst present in the coating material causes the reduction of the resistance to water, corrosion, etc. of the cross-linked film formed from the coating material. In order to remedy said disadvantages, the substitution of an N-alkoxyalkylated unsaturated carboxylic acid amide has been proposed for the unsaturated carboxylic acid amide used in the abovementioned polymerization method. Said substitution can remedy said disadvantages, and hence, is very advantageous in the production of a coating material.

Methods of preparing the N-alkoxyalkylated unsaturated carboxylic acid amide used in said advantageous method for producing a coating material are disclosed in French Pat. No. 1,475,282 and U.S. Pat. No. 3,079,434. One of the methods comprises dissolving an $\alpha,\beta$-ethylenically unsaturated carboxylic acid amide in an alcoholic solvent, adding an aldehyde and an alkali catalyst thereto to effect reaction between them to convert the carboxylic acid amide group into an N-alkylolamide group, adding to the resulting solution an acid, such as sulfuric, hydrochloric, oxalic or phosphoric acid to acidify the solution and then adding thereto an alcohol to dehydration-condense the N-alkylolamide group contained in the solution with the alcohol, thereby forming an N-alkoxyalkylated $\alpha,\beta$-monoethylenically unsaturated carboxylic acid. In order to isolate the thus obtained N-alkylalkylated unsaturated carboxylic acid amide, the salt and the acid as catalyst contained in said solution must be removed by distillation after neutralization from said solution. Therefore, a very complicated method is required for the isolation. Further, if the N-alkoxyalkylated $\alpha,\beta$-monoethylenically unsaturated carboxylic acid amide containing the acid catalyst and salt is used as a starting material for producing said copolymer-containing coating material, it follows that the salt and acid remain in the resulting coating material, whereby the characteristics of the film formed from this coating material are greatly deteriorated. Therefore, this method is undesired. Another method of preparing N-alkoxyalkylated unsaturated carboxylic acid amides comprises dissolving an $\alpha,\beta$-monoethylenically unsaturated carboxylic acid amide in a solvent, adding an aldehyde and an alcohol to the resulting solution and then adding thereto a quaternary ammonium salt of an acid to effect dehydration-condensation of the reactants to prepare an N-alkoxyalkylated unsaturated carboxylic acid amide. In order to isolate the resulting N-alkoxyalkylated unsaturated carboxylic acid amide from the solution, such a complicated method as mentioned above is also required. Further, if the resulting crude N-alkoxyalkylated unsaturated carboxylic acid amide solution is used as a starting material for producing the copolymer, the characteristics of films formed from this copolymer are greatly deteriorated. Therefore, this method is also undesired.

The present inventors have done research on the production of N-alkoxyalkylated unsaturated carboxylic acid amides to find that the use of an $\alpha,\beta$-ethylenically unsaturated carboxylic acid as the dehydration-condensation catalyst enables the desired product to be simply produced without being accompanied by the above-mentioned disadvantages.

According to the present invention, there is provided a process for producing a copolymerizable monomer mixture consisting essentially of an N-alkoxyalkylated acrylamide or methacrylamide and at least one α,β-ethylenically unsaturated carboxylic acid or its anhydride which comprises mixing a compound represented by the formula:

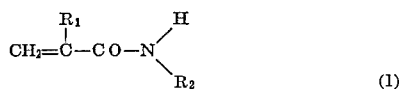

wherein $R_1$ is hydrogen or methyl group and $R_2$ is hydrogen or a lower ($C_1$-$C_4$) alkyl group or

group in which $R_3$ is hydrogen or a branched or straight alkyl group having 1 to 12 carbon atoms, and at least one α,β-ethylenically unsaturated carboxylic acid or its anhydride with at least one organic solvent capable of forming an azeotropic with water, at least one alcohol and, if necessary, at least one aldehyde and then heating the resulting mixture to subject it to dehydration-condensation under a reduced or ordinary pressure. When $R_2$ is the

group, no aldehyde is required to be used, though when $R_2$ is hydrogen or a lower alkyl group, the aldehyde is required to be used with the alcohol.

The compounds represented by Formula I which may be used in the present invention include acrylamide, methacrylamide, N-methyl acrylamide or methacrylamide, N-ethyl acrylamide or methacrylamide, N-hexyl acrylamide or methacrylamide, N-butyl acrylamide or methacrylamide, N-methylol acrylamide or methacrylamide, N-1-hydroxyethyl acrylamide or methacrylamide, N - 1 - hydroxybutyl acrylamide or methacrylamide and the like. The present process can be applied to other unsaturated carboxylic acid amides, such as itaconic acid amide, α-methylene-glutaric acid amide, crotonic acid amide or the like.

Examples of the α,β-ethylenically unsaturated carboxylic acids and anhydrides thereof which may be used in the present invention are preferably acrylic acid, methacrylic acid, itaconic acid, α-methylene-glutaric acid, maleic acid and anhydrides of these acids though any unsaturated carboxylic acid may be used. These acids act as a dehydration catalyst in the dehydration-condensation of the unsaturated carboxylic acid amide, the aldehyde and the alcohol, and are preferably used in a molar proportion to the compound represented by Formula I of 0.1/99.9 to 80/20. The dehydrating catalyst used in the present invention has the same effect as that of conventional dehydrating catalysts, such as sulfuric acid, hydrochloric acid, oxalic acid, phosphoric acid and quaternary ammonium salts of these acids. In addition, the acids used in the present invention have copolymerizability, and hence, can serve as one component in the production of a coating material. By incorporating said acid into the coating material in the form of a copolymer with other components, the cross-linkability of the copolymer can be enhanced. In addition, the acids do not deteriorate the properties of film unlike conventional non-copolymerizable acids even when incorporated into the film.

The aldehydes which may be used in the present invention are preferably formaldehyde, acetaldehyde, paraformaldehyde, butyraldehyde, propylaldehyde, benzaldehyde, and addition products of these aldehydes to alcohols though any aldehyde may be used. As the alcohols, there may be used methanol, ethanol, butanol, propanol, hexanol, cyclohexanol and the like.

As the organic solvent capable of forming an azeotrope with water, there may be used such conventional organic solvents as benzene, toluene, xylene, ethyl acetate, chloroform and the like, and in addition thereto, vinyl monomers, such as acrylonitrile, methyl acrylate, methyl methacrylate and the like, may be used. Said organic solvents are used to effectively remove the water liberated in the step of converting the unsaturated carboxylic acid amide to N-alkoxyalkylated unsaturated carboxylic acid amide.

The copolymerizable monomer mixture obtained by the present process is very advantageous in that since the monomer mixture contains a copolymerizable carboxylic acid as the dehydrating catalyst, substantially no impurities other than the film-forming components are incorporated into a coating material prepared by copolymerizing said monomer mixture with other comonomers, unlike the case of use of conventional non-polymerizable acids as the dehydrating catalyst.

In the present invention, the dehydration-condensation reaction may be effected at a temperature lower than 100° C., preferably between 70° C. and 97° C. under a reduced or ordinary pressure, and hence, the following side reactions (A) to (C) to produce divinyl monomers are avoidable:

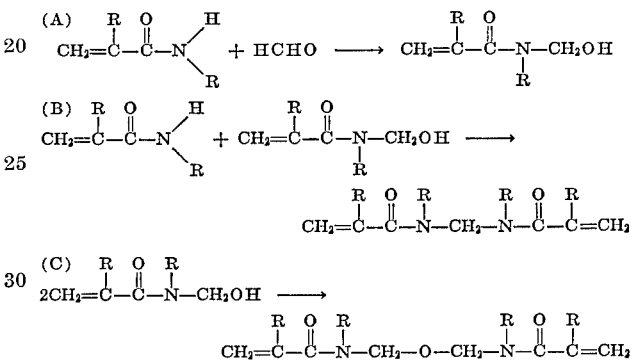

The present invention is further explained by referring to the following examples which are only by way of illustration and not by way of limitation.

EXAMPLE 1

The following compounds were charged into a three-necked flask fitted with a stirrer, a decanter and a thermometer, and the resulting mixture was dehydration-condensed at 70–97° C. for 6 hrs.:

|  | Parts by wt. |
|---|---|
| Acrylamide | 444 |
| n-Butanol | 760 |
| Benzene | 700 |
| Itaconic acid | 162.5 |
| 40% n-butanol solution of formaldehyde | 538 |
| Hydroquinone monomethyl ether | 3.5 |

The decanter had previously been charged with benzene, and the time when the amount of effluent water had reached a given amount was deemed as the termination of the condensation reaction. The resulting product was analyzed according to gas chromatography to find that the conversion of acrylamide to N-n-butoxymethyl acrylamide was 96.5%. 2,500 parts by weight of the said product was heated at 60–84° C. at a reduced pressure of 160 mm. Hg, for about 2.6 hours, to distil the benzene as 735 parts by weight of distillate.

EXAMPLE 2

The following compounds were charged into the same flask as in Example 1 and subjected to dehydration-condensation in the same manner as in Example 1 to obtain a monomer mixture comprising N-n-butoxymethyl acrylamide and itaconic acid:

|  | Parts by wt. |
|---|---|
| N-methylolacrylamide | 632 |
| n-Butanol | 1030 |
| Benzene | 703 |
| Itaconic acid | 162.5 |
| Hydroquinone monomethyl ether | 3.5 |

The resulting product was analyzed according to gas chromatography to find that the conversion of N-methylol acrylamide to N-n-butoxymethyl acrylamide was 97.5% by weight. 2,500 parts by weight of the said product was mixed with 1,055 parts by weight of isopropanol, and benzene was distilled off as 1,055 parts by weight of an azeotrope with the isopropanol.

EXAMPLE 3

The same procedure as in Example 1 was repeated, except that the following compounds were substituted for the starting compounds to obtain a monomer mixture comprising N-n-butoxymethyl acrylamide, itaconic acid and acrylonitrile:

| | Parts by wt. |
|---|---|
| Acrylamide | 444 |
| 40% n-butanol solution of formaldehyde | 538 |
| Acrylonitrile | 700 |
| Itaconic acid | 162.5 |
| Hydroquinone monomethyl ether | 3.5 |
| n-Butanol | 760 |

The resulting product was analyzed according to gas chromatography to find that the conversion of acrylamide to N-n-butoxymethyl acrylamide was 96.0% by weight.

EXAMPLE 4

The same procedure as in Example 1 was repeated, except that the following compounds were substituted for the starting compounds to obtain a monomer mixture comprising N-n-butoxymethyl acrylamide and methacrylic acid:

| | Parts by wt. |
|---|---|
| N-methylol acrylamide | 632 |
| n-Butanol | 1030 |
| Benzene | 703 |
| Methacrylic acid | 120 |
| Hydroquinone monomethyl ether | 3.5 |

The resulting product was analyzed according to gas chromatography to find that the conversion of N-methylol acrylamide to N-n-butoxymethyl acrylamide was 96.3% by weight. This product was carefully concentrated to isolate N-n-butoxymethyl acrylamide having a boiling point of 110–115° C./1 mm. Hg in an yield of 85% by weight.

EXAMPLE 5

The same procedure as in Example 1 was repeated, except that the following compounds were substituted for the starting compounds to obtain a monomer mixture comprising N-n-butoxymethyl acrylamide and α-methyleneglutaric acid:

| | Parts by wt. |
|---|---|
| Acrylamide | 444 |
| 40% n-butanol solution of formaldehyde | 538 |
| n-Butanol | 760 |
| Benzene | 700 |
| α-Methyleneglutaric acid | 180 |
| Hydroquinone monomethyl ether | 3.5 |

The resulting product was analyzed according to gas chromatography to find that the conversion of acrylamide to N-n-butoxymethyl acrylamide was 95.5% by weight.

EXAMPLE 6

The same procedure as in Example 2 was repeated, except that the following compounds were substituted for the starting compounds to obtain a monomer mixture as shown in Table 1:

| | | |
|---|---|---|
| Amide as shown in Table 1 | moles | 6.25 |
| Alcohol as shown in Table 1 | do | 14 |
| Unsaturated carboxylic acid as shown in Table 1 | moles | 1.25 |
| N-methylol acrylamide | | 632 |
| Benzene | grams | 703 |
| Hydroquinone | do | 3.5 |

TABLE 1

| Starting amide | Alcohol | Unsaturated carboxylic acid | Amide compound obtained and its content | Analytical result, percent | | |
|---|---|---|---|---|---|---|
| | | | | Benzene content | Alcohol content | Unsaturated carboxylic acid content |
| N-hydroxyethyl acrylamide | n-Butanol | Itaconic acid | N-n-butoxyethyl acrylamide, 42.5 | 28.1 | 22.9 | 6.5 |
| N-1-hydroxypropyl methacrylamide | do | do | N-n-butoxypropyl methacrylamide, 43.5 | 26.5 | 22.0 | 6.2 |
| N-methylol methacrylamide | Isopropanol | do | N-isopropoxymethyl methacrylamide, 41.2 | 30.7 | 21.0 | 7.1 |
| Do | Cyclohexanol | do | N-cyclohexoxymethyl methacrylamide, 42.0 | 24.8 | 27.5 | 5.7 |
| Do | n-Butanol | Acrylic acid | N-n-butoxymethyl methacrylamide, 44.7 | 22.3 | 27.4 | 5.6 |

EXAMPLE 7

The following compounds were subjected to dehydration-condensation in the same manner as in Example 1, except that the reaction was effected for 2.6 hrs. to obtain a monomer mixture having an analytical result as shown in Table 2:

| | | |
|---|---|---|
| Acrylamide | moles | 6.25 |
| Unsaturated carboxylic acid as shown in Table 2 | do | 1.53 |
| n-Butanol | grams | 760 |
| 40% n-butanol solution of aldehyde as shown in Table 2 | do | 538 |
| Benzene | do | 700 |
| Hydroquinone | do | 3.5 |

TABLE 2

| Aldehyde | Unsaturated carboxylic acid | Amide compound obtained and its content | Analytical result, percent | | |
|---|---|---|---|---|---|
| | | | Benzene content | n-Butanol content | Unsaturated carboxylic acid content |
| Formaldehyde | Maleic anhydride | N-n-butoxymethyl acrylamide, 40.5 | 30.5 | 22.5 | 2.3 |
| Do | Acrylic acid | N-n-butoxymethyl acrylamide, 40.9 | 29.5 | 21.3 | 8.6 |
| Acetaldehyde | α-Methylene-glutaric acid | N-n-butoxyethyl acrylamide, 40.1 | 27.5 | 23.0 | 6.7 |
| Propyladehyde | do | N-n-butoxybutyl acrylamide, 41.2 | 25.8 | 22.5 | 6.2 |

EXAMPLE 8

The following compounds were subjected to dehydration-condensation in the same manner as in Example 3:

| | Parts by wt. |
|---|---|
| Acrylamide | 444 |
| 40% n-butanol solution of formaldehyde | 538 |
| Methyl methacrylate (solvent) | 700 |
| Itaconic acid | 162.5 |
| Hydroquinone monomethyl ether | 3.5 |
| n-Butanol | 700 |

The resulting product was analyzed according to gas chromatography to find that the N-n-butoxymethyl acrylamide content was 41.3% by weight, the methyl methacrylate content was 25% by weight, the itaconic acid content was 7.1% by weight and the n-butanol content was 23.2% by weight. The conversion of the acrylamide to N-n-butoxymethyl acrylamide was 97.5%.

EXAMPLE 9 (PRODUCTION OF COPOLYMERS)

(A) Production of copolymer from the monomer mixture obtained in Example 2

(1) The compounds shown below were charged into a four-necked flask fitted with a stirrer, a thermometer and a cooler, and the mixture was polymerized in a nitrogen atmosphere at 68° C. for 10 hours and then at 75° C. for additional 2 hours.

| | Parts by wt. |
|---|---|
| 2-ethylhexyl acrylate | 806 |
| Styrene | 520 |
| N-butoxymethylacrylamide-itaconic acid mixture obtained in Example 2 | 965 |
| Itaconic acid | 16.5 |
| Azobisisobutyronitrile | 59.0 |
| 2-mercaptoethanol | 22.5 |
| Isopropanol | 763 |

To the thus obtained resin solution, 44.4 parts by weight of β-dimethylaminoethanol was added to prepare a resin having $T_g$ of —9° C., pKa of 9.20, $n$ of 1.17, and $\alpha$ of 40%.

(2) A mixture comprising the compounds shown below was polymerized under the same conditions as in Example 9(A)(1), and was neutralized with 17.8 parts by weight of β-dimethylaminoethanol to obtain a resin solution having a solids content of 57.2% by weight, an acid number of 19.6, and a viscosity of U (Gardner).

| | Parts by wt. |
|---|---|
| 2-ethylhexyl acrylate | 276 |
| Styrene | 207 |
| 2-hydroxyethyl methacrylate | 31.3 |
| N-butoxymethyl acrylamide-itaconic acid mixture obtained in Example 2 | 389 |
| Itaconic acid | 6.5 |
| Isopropanol | 312 |
| Azobisisobutyronitrile | 22.4 |
| 2-mercaptoethanol | 6 |

The thus obtained resin had $T_g$ of —1.5° C., pKa of 8.73, $n$ of 1.15, and $\alpha$ of 40%.

(3) A mixture comprising the compounds shown below was polymerized under the same conditions as in Example 9(A)(1), and was neutralized with 44.4 parts by weight of β-dimethylaminoethanol to obtain a resin solution having a solid content of 57.7%, a viscosity of U (Gardner), and an acid number of 19.3.

| | Parts by wt. |
|---|---|
| Ethyl acrylate | 447 |
| Lauryl methacrylate | 359 |
| Styrene | 520 |
| N-butoxymethyl acrylamide-itaconic acid mixture obtained in Example 2 | 965 |
| Itaconic acid | 16.5 |
| Azobisisobutyronitrile | 59.0 |
| 2-mercaptoethanol | 22.5 |
| Isopropanol | 763 |

The thus obtained resin had $T_g$ of 20° C., pKa of 9.15, $n$ of 1.18, and $\alpha$ of 40%.

(B) Production of copolymer from the monomer mixture obtained in Example 4

A mixture comprising the compounds shown below was polymerized under the same conditions as in Example 9(A)(1), and was neutralized with 17.8 parts by weight of β-dimethylaminoethanol to obtain a resin solution having a solids content of 57.5% by weight, a viscosity of Q (Gardner), and an acid number of 19.9.

| | Parts by wt. |
|---|---|
| 2-ethylhexyl acrylate | 234 |
| Ethyl acrylate | 100 |
| Styrene | 156 |
| N-butoxymethyl acrylamide distilled and isolated from the mixture obtained in Example 4 | 157 |
| Itaconic acid | 32.5 |
| Azobisisobutyronitrile | 22.5 |
| 2-mercaptoethanol | 9 |
| Isopropanol | 539 |

The resin obtained had $T_g$ of —23.5° C., pKa of 8.79, $n$ of 1.11, and $\alpha$ of 40%.

(C) Production of copolymer from the monomer mixture obtained in Example 3

A mixture comprising the compounds shown below was polymerized in the same manner as in Example 9(A)(1) and was neutralized with 8.9 parts by weight of β-diethylaminoethanol to obtain a resin solution having a solids content of 59.6% by weight, a viscosity of Y (Gardner), and an acid number of 10.5.

| | Parts by wt. |
|---|---|
| 2-ethylhexyl acrylate | 340 |
| Styrene | 234 |
| N-butoxymethyl acrylamide-itaconic acid-acrylonitrile mixture obtained in Example 3 | 200 |
| Itaconic acid | 3.25 |
| Azobisisobutyronitrile | 22.5 |
| 2-mercaptoethanol | 6 |
| Isopropanol | 332.3 |

The resulting resin had $T_g$ of —1.5° C., pKa of 8.7, $n$ of 1.19, and $\alpha$ of 40%.

(D) Production of copolymer from the monomer mixture obtained in Example 1

Into the same device as in Example 9(A)(1) were charged 50 parts by weight of azobisisobutyronitrile, 10 parts by weight of 2-mercaptoethanol, and a mixture comprising the compounds shown below.

| | Parts by wt. |
|---|---|
| Ethyl acrylate | 693 |
| Styrene | 426 |
| N-butoxymethyl acrylamide-itaconic acid mixture obtained in Example 1 | 486 |
| Isopropanol | 800 |

The resulting mixture was elevated in temperature in 2 hours. In this case, 5 parts by weight of 2-mercaptoethanol and 3 parts by weight of azobisisobutyronitrile were added, and the mixture was maintained at 68° C. After 2 hours, 3 parts by weight of azobisisobutyronitrile was added, and the heating was continued for an additional 2 hours. At 6 hours after the beginning, the temperature was elevated to 75° C. and polymerization was effected for an additional 2 hours. The resulting solution was neutralized by addition of 17.8 parts of β-dimethylaminoethanol to obtain a resin solution having a solids content of 54.3% by weight, a viscosity of R (Gardner), and an acid number of 9.8. This resin had $T_g$ of 17.5° C., pKa of 9.0, $n$ of 0.88, and $\alpha$ of 40%.

What we claim is:

1. A process for producing a copolymerizable monomer mixture consisting essentially of an N-alkoxyalkylated unsaturated carboxylic acid amide and an α,β-ethylenically unsaturated carboxylic acid or anhydride thereof selected from the group consisting of acrylic acid, methacrylic acid, itaconic acid, α-methylene glutaric acid, maleic acid and anhydrides thereof, which comprises mixing (1) an unsaturated carboxylic acid amide represented by the formula

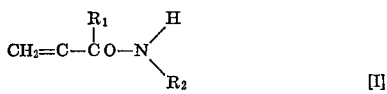 [I]

wherein $R_1$ is hydrogen or methyl group and $R_2$ is hydrogen, a lower alkyl or

in which $R_3$ is hydrogen or an alkyl group having 1 to 12 carbon atoms, and
(2) said $\alpha,\beta$-ethylenically unsaturated carboxylic acid or anhydride thereof, with
(3) an organic solvent other than an alcohol or an aldehyde azeotropic with water and
(4) a member of the group consisting of
  (a) an alcohol and
  (b) a mixture of an alcohol with an aldehyde with the proviso that when $R_2$ is hydrogen or lower alkyl (4) must be (b), the molar proportion of the compound represented by Formula I to the $\alpha,\beta$-ethylenically unsaturated carboxylic acid or its anhydride being from 99.9/0.1 to 20/80, and then subjecting the resulting mixture to dehydrogenation-condensation under a reduced or ordinary pressure.

2. A process according to claim 1, wherein the compound represented by Formula I is selected from the group consisting of acrylamide, methacrylamide, N-methyl acrylamide, N-methyl methacrylamide, N-ethyl acrylamide, N-ethyl methacrylamide, N-hexyl acrylamide, N-hexyl methacrylamide, N-butyl acrylamide, N-butyl methacrylamide, N-1-hydroxyethyl acrylamide, N-1-hydroxyethyl methacrylamide, N-1-hydroxybutyl acrylamide and N-1-hydroxybutyl methacrylamide.

3. A process according to claim 1, wherein the organic solvent is a member selected from the group consisting of benzene, toluene, xylene, ethyl acetate and chloroform.

4. A process according to claim 1, wherein the organic solvent is a member selected from the group consisting of acrylonitrile, methyl acrylate and methyl methacrylate.

5. A process according to claim 1, wherein the dehydration-condensation is effected at a temperature of 100° C. or less.

6. A process according to claim 1, wherein the alcohol is an alkanol.

7. A process according to claim 6 wherein the alcohol is an alkanol having 1 to 6 carbon atoms or cyclohexanol and the aldehyde is formaldehyde, paraformaldehyde, acetaldehyde, propylaldehyde, butylaldehyde or benzaldehyde.

8. A process according to claim 7 wherein the alcohol is methanol, ethanol, isopropanol, propanol, butanol, hexanol or cyclohexanol.

References Cited

UNITED STATES PATENTS

| 3,037,963 | 6/1962 | Christenson | 260—72 |
| 3,079,434 | 2/1963 | Christenson et al. | 260—72 |
| 3,163,623 | 12/1964 | Sekmakas et al. | 260—72 |

FOREIGN PATENTS

| 1,027,813 | 4/1966 | Great Britain | 260—29.4 |
| 1,115,130 | 5/1968 | Great Britain. | |

CARL D. QUARFORTH, Primary Examiner

I. GLUCK, Assistant Examiner

U.S. Cl. X.R.

252—188.3 R; 260—29.4 UA, 78.5 R, 80.3 N, 851